US011390377B2

(12) United States Patent
Ni et al.

(10) Patent No.: US 11,390,377 B2
(45) Date of Patent: Jul. 19, 2022

(54) UNMANNED AERIAL VEHICLE AND UNDERCARRIAGE

(71) Applicant: AUTEL ROBOTICS CO., LTD., Guangdong (CN)

(72) Inventors: Feng Ni, Guangdong (CN); Xingwen Wu, Guangdong (CN); Fei Dong, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 349 days.

(21) Appl. No.: 16/740,316

(22) Filed: Jan. 10, 2020

(65) Prior Publication Data
US 2020/0148338 A1 May 14, 2020

Related U.S. Application Data

(63) Continuation of application No. PCT/CN2018/082219, filed on Apr. 8, 2018.

(30) Foreign Application Priority Data

Jun. 13, 2017 (CN) .......................... 201720686516.5

(51) Int. Cl.
*B64C 25/12* (2006.01)
*B64C 25/24* (2006.01)
(Continued)

(52) U.S. Cl.
CPC .............. *B64C 25/12* (2013.01); *B64C 25/24* (2013.01); *B64C 39/024* (2013.01); *B64C 25/14* (2013.01);
(Continued)

(58) Field of Classification Search
CPC ......... B64C 25/10; B64C 25/12; B64C 25/14; B64C 25/18; B64C 25/20; B64C 25/24; B64C 2025/125
See application file for complete search history.

(56) References Cited

U.S. PATENT DOCUMENTS 2,015,920 A   10/1935  Canney
2,021,439 A * 11/1935  Wells ...................... B64C 25/10
                                                          244/102 R
(Continued)

FOREIGN PATENT DOCUMENTS

CN    105346710 A    2/2016
CN    105905275 A    8/2016
(Continued)

*Primary Examiner* — Richard G Davis

(57) ABSTRACT

The utility model relates to an unmanned aerial vehicle and an undercarriage thereof. The undercarriage includes: a power assembly disposed within a fuselage, the power assembly including a first connecting member and a drive apparatus configured to drive the first connecting member to perform a reciprocating linear motion; and an undercarriage body connected to the power assembly, the undercarriage body including a first connecting rod hinged on the first connecting member, and a second connecting rod of which one end is hinged on the power assembly and the other end is hinged on the first connecting rod. When the first connecting member performs the reciprocating linear motion, the undercarriage body is driven to be unfolded or folded into the fuselage. The utility model further relates to an unmanned aerial vehicle. For the foregoing unmanned aerial vehicle and the undercarriage thereof, the power assembly may be used to drive the undercarriage body to switch between an unfolded state and a folded state. When aerial photography is required, the undercarriage body may be at least partially folded into the fuselage, to avoid blocking an aerial photography device on the unmanned aerial vehicle.

8 Claims, 3 Drawing Sheets

(51) Int. Cl.
*B64C 39/02* (2006.01)
*B64C 25/14* (2006.01)
*B64D 47/08* (2006.01)

(52) U.S. Cl.
CPC ........ *B64C 2201/027* (2013.01); *B64D 47/08* (2013.01)

(56) References Cited

U.S. PATENT DOCUMENTS

| | | | |
|---|---|---|---|
| 2,185,235 A | 1/1940 | Swanson | |
| 2012/0111999 A1* | 5/2012 | Acks | B64C 25/34 244/102 A |
| 2014/0263823 A1* | 9/2014 | Wang | B64C 27/08 244/17.23 |
| 2016/0207611 A1* | 7/2016 | Fenny | B64C 25/60 |
| 2017/0101174 A1* | 4/2017 | Ou | B64C 39/024 |

FOREIGN PATENT DOCUMENTS

| | | |
|---|---|---|
| CN | 106697275 A | 5/2017 |
| EP | 3045389 A1 | 7/2016 |
| GB | 398411 A | 9/1933 |

\* cited by examiner

UNMANNED AERIAL VEHICLE AND UNDERCARRIAGE

CROSS-REFERENCE

This application is a continuation of International Patent Application No. PCT/CN2018/082219 filed on Apr. 8, 2018, which claims priority to Chinese Patent Application No. 201720686516.5 filed on Jun. 13, 2017, both of which are hereby incorporated by reference in their entirety.

BACKGROUND

Technical Field

The utility model relates to the field of an aircraft, and in particular, to an unmanned aerial vehicle and an undercarriage thereof.

Related Art

A current undercarriage of an unmanned aerial vehicle often blocks an aerial photography device in the air, and cannot be accommodated into a fuselage upon landing, leading to inconvenience for carrying.

SUMMARY

On this basis, an undercarriage and an unmanned aerial vehicle are provided to resolve the foregoing problems, which may not block an aerial photography device on the unmanned aerial vehicle.

An undercarriage applied to an unmanned aerial vehicle, the unmanned aerial vehicle including a fuselage, and the undercarriage including:

a power assembly disposed within the fuselage, the power assembly including a first connecting member and a drive apparatus configured to drive the first connecting member to perform a reciprocating linear motion; and an undercarriage body including a first connecting rod hinged on the first connecting member, and a second connecting rod of which one end is hinged on the power assembly and the other end is hinged on the first connecting rod; when the first connecting member performs the reciprocating linear motion, the undercarriage body being driven to be unfolded or folded into the fuselage.

In one embodiment, the drive apparatus includes a motor and a screw rod connected to the motor, the first connecting member being sleeved on the screw rod and being screwed to the screw rod.

In one embodiment, a middle portion of the first connecting member bends toward a direction away from the motor.

In one embodiment, the power assembly further includes a second connecting member that is fixed to the screw rod and that is at an end opposite to the motor, one end of the second connecting rod being hinged on the second connecting member, and the other end thereof being hinged on the first connecting rod.

In one embodiment, a middle portion of the second connecting member bends toward a direction close to the motor.

In one embodiment, an angle between the second connecting rod and the screw rod when the undercarriage body is unfolded is greater than an angle between the second connecting rod and the screw rod when the undercarriage body is folded.

In one embodiment, an angle between the first connecting rod and the screw rod is less than 90 degrees when the undercarriage body is unfolded, and the first connecting rod is parallel to the screw rod when the undercarriage body is folded.

In one embodiment, the first connecting rod further includes a support rod, the support rod causing the first connecting rod to be T-shaped.

In one embodiment, the first connecting rod bends toward a direction keeping off an element inside the fuselage.

An unmanned aerial vehicle includes a fuselage and the foregoing undercarriage that, when being folded, is located in the fuselage.

For the foregoing unmanned aerial vehicle and the undercarriage thereof, the power assembly may be used to drive the undercarriage body to switch between an unfolded state and a folded state. When aerial photography is required, the undercarriage body may be at least partially folded into the fuselage, to avoid blocking an aerial photography device on the unmanned aerial vehicle.

DETAILED DESCRIPTION

Figure 1:
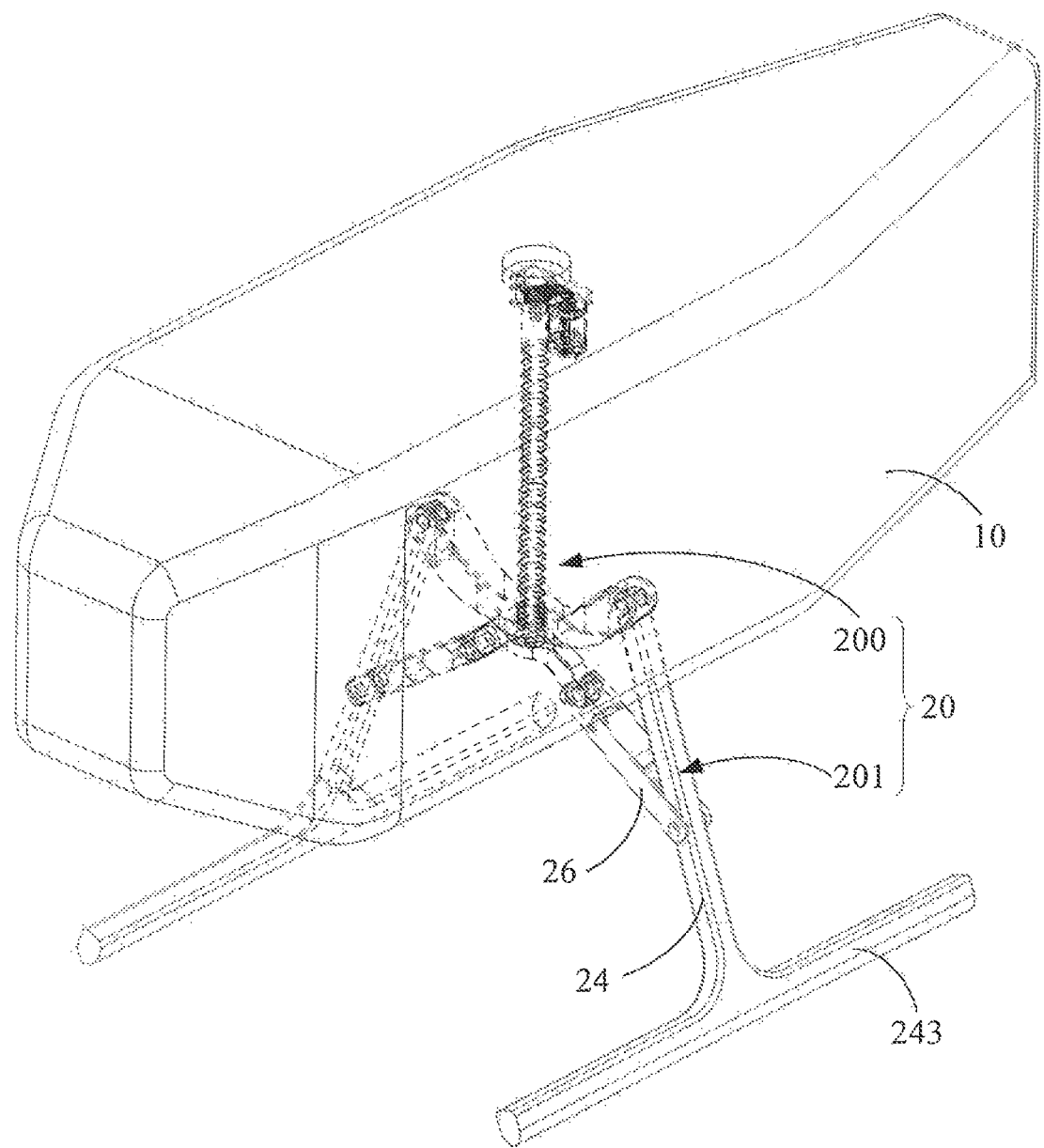
FIG. 1 is a schematic structural diagram of an unmanned aerial vehicle according to an embodiment of the utility model.

As shown in FIG. 1, an unmanned aerial vehicle provided in an embodiment of the utility model includes a fuselage 10 and an undercarriage 20 mounted on the fuselage 10. Other members such as a wing and an aerial photography device may further be mounted on the fuselage 10. The undercarriage 20 includes a power assembly 200 and an undercarriage body 201. The power assembly 200 is configured to drive the undercarriage body 201 to unfold or fold relative to the fuselage 10. The undercarriage body 201, when being folded, may be at least partially folded into the fuselage 10. Through controlling the unfolded state or folded state of the undercarriage 20, the unmanned aerial vehicle may be adapted to different use scenarios. For example, when the unmanned aerial vehicle needs to land, the undercarriage 20 may be unfolded to cause the unmanned aerial vehicle to land safely. During flying, or carrying or transporting after landing of the unmanned aerial vehicle, the undercarriage 20 may be folded. In this way, normal working of other devices (such as an aerial photography device) carried on the unmanned aerial vehicle is not affected during flight. During carrying, the unmanned aerial vehicle may have a smaller volume to facilitate storage and packaging.

Figure 2:
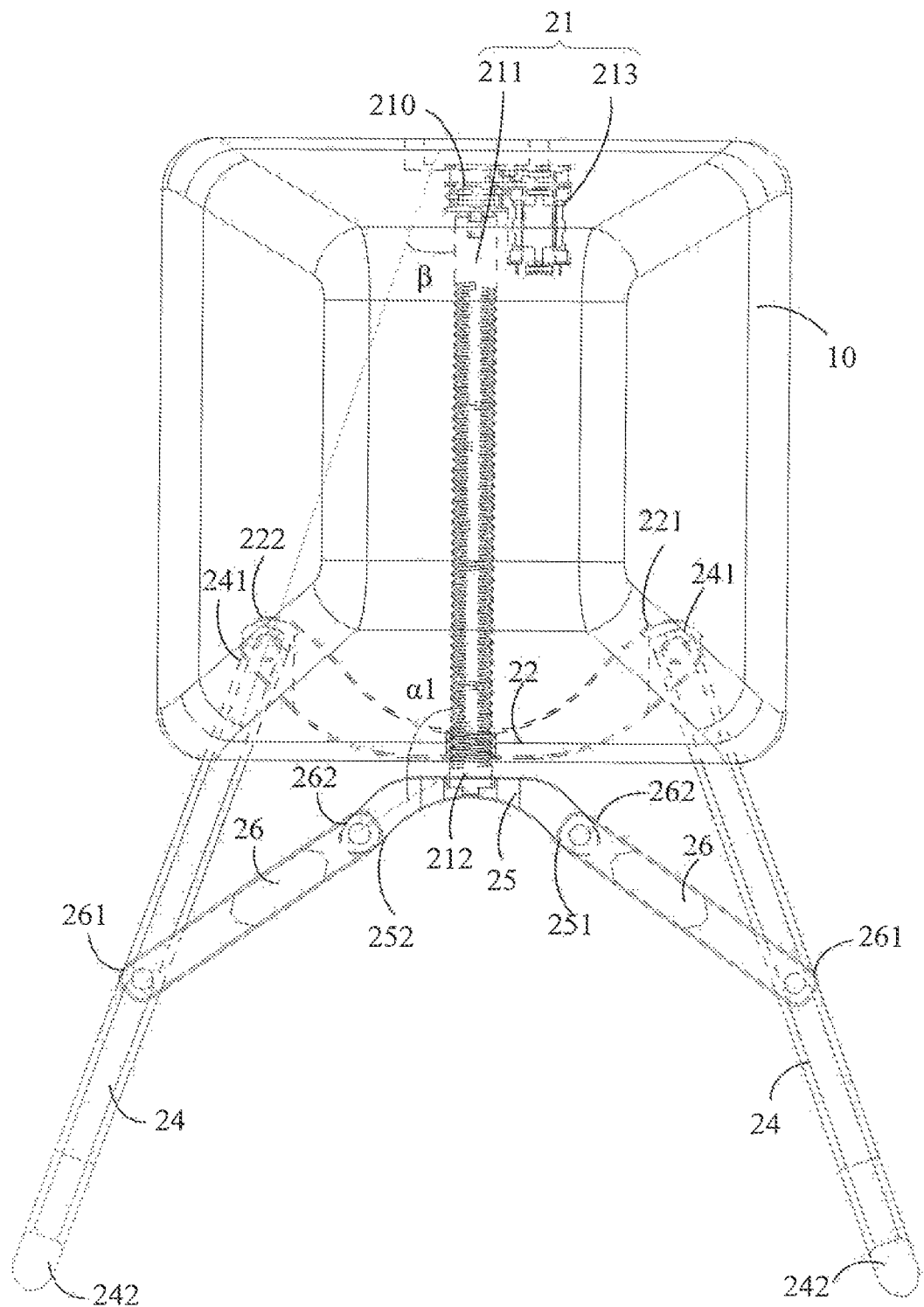
FIG. 2 is a schematic structural diagram of an undercarriage in an unfolded state in an unmanned aerial vehicle according to an embodiment of the utility model.
Figure 3:
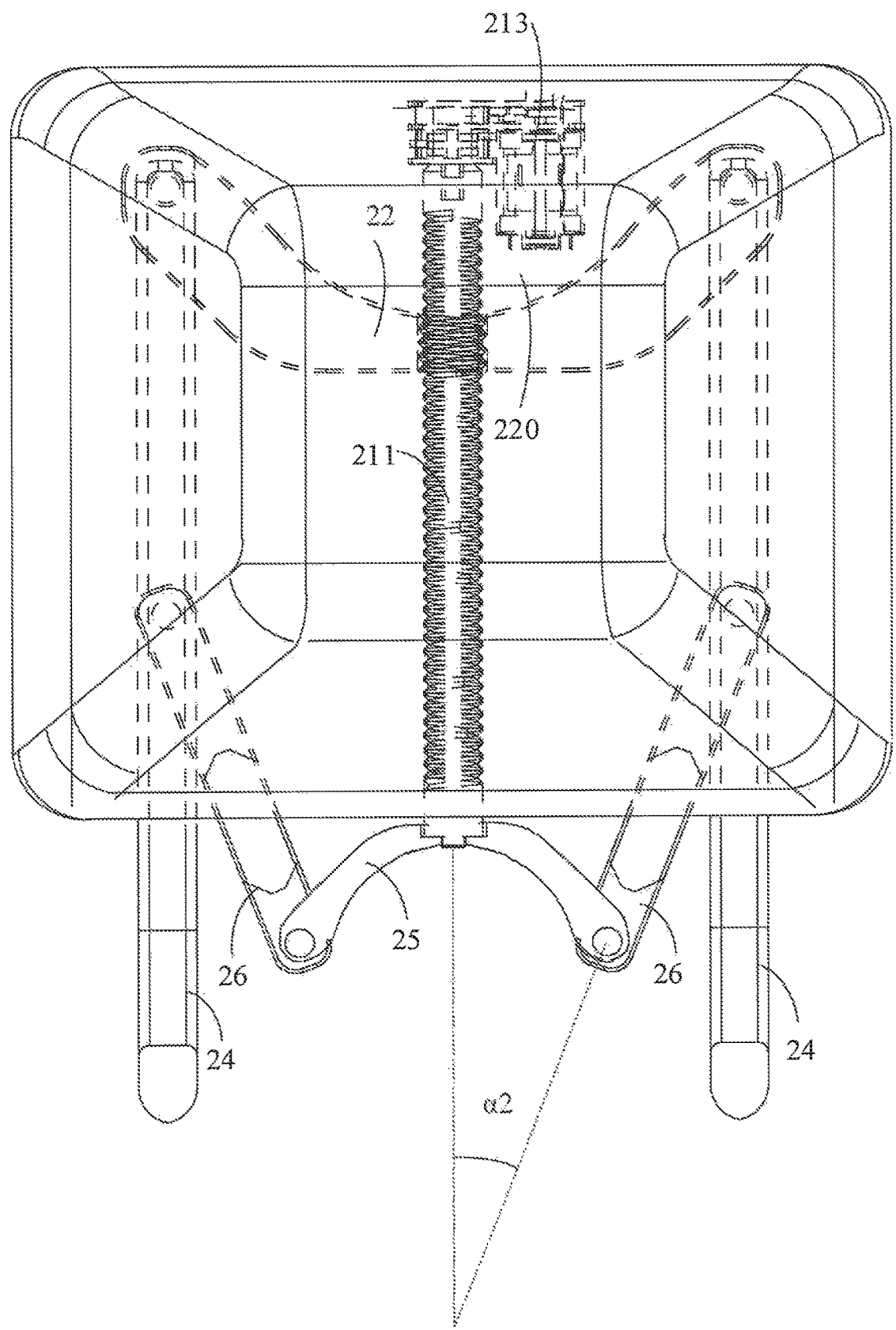
FIG. 3 is a schematic structural diagram of an undercarriage in a folded state in an unmanned aerial vehicle according to an embodiment of the utility model.

Referring to both FIG. 2 and FIG. 3, a power assembly 200 is disposed within a fuselage 10 and includes a drive apparatus 21 and a first connecting member 22. The drive apparatus 21 drives the first connecting member 22 to perform a reciprocating linear motion. In an optional embodiment, the drive apparatus 21 includes a screw rod 211 and a motor 213. The screw rod 211 is connected to an output shaft of the motor 213 and may be driven by the motor 213 to rotate. The motor 213 may directly drive the screw rod 211 to rotate through a coupling, or may drive the screw rod 211 to rotate through an intermediate transmission member such as a gear. Mounting space and an avoiding groove may be disposed within the fuselage 10 of the unmanned aerial vehicle. The motor 213 and the screw rod 211 may be disposed within the mounting space, and the avoiding groove may provide an avoiding passage for movement of an undercarriage body 201.

The screw rod 211 includes a first end 210 and a second end 212 opposite to each other. In an embodiment, the first end 210 of the screw rod 211 is disposed within the fuselage 10, for example, may be within the mounting space of the fuselage 10. A second end 212 of the screw rod 211 is exposed outside the fuselage 10, and a second connecting member 25 is further disposed at the second end 212. The first connecting member 22 is sleeved on the screw rod 211 and is screwed to the screw rod 211. The motor 213 may drive the screw rod 211 to rotate so as to cause the first connecting member 22 to move up and down along an axial direction of the screw rod 211 on the screw rod 211, so that a first connecting rod 24 and a second connecting rod 26 rotate along different directions, thereby performing switching between an unfolded state and a folded state of the undercarriage body 201. During the switching between the unfolded state and the folded state of the undercarriage body 201, a position of the screw rod 211 relative to the fuselage 10 keeps unchanged.

In other embodiments, the drive apparatus 21 may also form a transmission connection with the first connecting member 22 through a transmission member such as a conveyor belt, thereby driving the first connecting member 22 to directly reciprocate.

The undercarriage body 201 includes a first connecting rod 24 hinged on the first connecting member 22, and a second connecting rod 26 of which an end is hinged on the second connecting member 25 and the other end is hinged on the first connecting rod 24. The first connecting rod 24 includes a first end 241 and a second end 242 opposite to each other. The first end 241 of the first connecting rod 24 is hinged on the first connecting member 22. The second end 242 of the first connecting rod 24 is configured to support the unmanned aerial vehicle. The first connecting rod 24 may have various shapes, such as a straight rod shape. In some other embodiments, the first connecting rod 24 may also bend toward a direction keeping off an internal element of the fuselage 10, so as not to interfere with the internal element of the fuselage 10 during rotation of the first connecting rod 24. In addition, as shown in FIG. 1, the first connecting rod 24 may further include a support rod 243, the support rod 243 being cross-connected with the second end 242, so that the first connecting rod 24 is T-shaped as a whole.

The second connecting rod 26 includes a first end 261 and a second end 262 opposite to each other. The first end 261 of the second connecting rod 26 is rotatably connected between the first end 241 of the first connecting rod 24 and the second end 242 of the first connecting rod 24. The second end 262 of the second connecting rod 26 is rotatably connected to the second connecting member 25. The second connecting rod 26 may be straight or curved.

When the drive apparatus 21 drives the first connecting member 22 to perform a reciprocating linear motion, the undercarriage body 201 may be unfolded outside the fuselage 10 or folded into the fuselage 10. As shown in FIG. 2, when the drive apparatus 21 drives the first connecting member 22 to perform a linear motion to an extreme position along a direction toward an outside of the fuselage 10, the undercarriage body 201 is completely unfolded, and the second connecting rod 26 and a portion of the first connecting rod 24 are located outside the fuselage 10. In this case, an angle between the first connecting rod 24 and the screw rod 211 is $\beta<90°$, and an angle between the second connecting rod 26 and the screw rod is $\alpha 1>90$ degrees.

As shown in FIG. 3, through controlling the motor 213 to drive the screw rod 211 to rotate, the first connecting member 22 moves from bottom to top along the screw rod 211. Due to rotation connection relations between the first connecting rod 24, the first connecting member 22, the second connecting rod 26, and the second connecting member 25, the first connecting member 22 and the first connecting rod 24 may move within the fuselage 10, and the second connecting rod 26 is driven to cause a portion of the second connecting rod 26 to be folded and enter the fuselage 10. In addition, a rotation joint between the second connecting rod 26 and the first connecting rod 24 is also located within the fuselage 10, so as to finally fold the undercarriage 20. In this case, an angle formed between the second connecting rod 26 and the screw rod 211 is $\alpha 2<90$ degrees. During switching from an unfolded state to a folded state, the angle $\beta$ between the first connecting rod 24 and the screw rod 211 first becomes larger and then becomes smaller. Finally, when the undercarriage body is in a fully folded state, the angle between the first connecting rod 24 and the screw rod 211 is $0°$.

In an embodiment, a middle portion of the first connecting member 22 bends toward a direction away from the motor 213. In other words, anti-collision space 220 is disposed between the first connecting member 22 and the screw rod 211 to keep off the motor 213. As shown in FIG. 3, when the undercarriage 20 is in the folded state, the motor 213 may be at least partially accommodated in the anti-collision space 220. In this way, the first connecting road 24 may be raised to a sufficient height on the premise that the first connecting member 22 may be prevented from interfering with the power source 220, so as to fold the undercarriage body into the fuselage 10 to a greater extent.

In a possible embodiment of the present invention, a middle portion of the second connecting member 25 may bend toward a direction close to the motor 213, so that the undercarriage body is easily folded into the fuselage 10.

For the undercarriage 20 in the foregoing embodiment, one motor 213 may be used to drive all first connecting rods 24 for supporting the unmanned aerial vehicle to be unfolded or folded, achieving a simpler structure. In addition, when the undercarriage 20 is in the folded state, at least a part of a structure thereof is located within the fuselage 10 to reduce a volume occupied by the unmanned aerial vehicle to the greatest extent, thereby facilitating carrying.

Various technical features in the foregoing embodiments may be combined randomly. For ease of description, possible combinations of various technical features in the foregoing embodiments are not all described. However, the combinations of the technical features should be considered as falling within the scope recorded in this specification provided that the combinations of the technical features are compatible with each other.

The foregoing embodiments only describe several implementations of the utility model, and their description is specific and detailed, but cannot therefore be understood as a limitation to the patent scope of the utility model. It should be noted that, a person of ordinary skill in the art may make various changes and improvements without departing from the ideas of the utility model, which shall all fall within the protection scope of the utility model. Therefore, the protection scope of the patent of the utility model shall be subject to the appended claims.

What is claimed is:

1. An undercarriage applied to an unmanned aerial vehicle, the unmanned aerial vehicle comprising a fuselage, wherein the undercarriage comprises:
a power assembly disposed within the fuselage, the power assembly comprising a first connecting member and a drive apparatus configured to drive the first connecting member to perform a reciprocating linear motion; and
an undercarriage body comprising a first connecting rod hinged on the first connecting member, and a second connecting rod of which one end is hinged on the power assembly and the other end is hinged on the first connecting rod; when the first connecting member performs the reciprocating linear motion, the undercarriage body being driven to be unfolded or folded into the fuselage;
wherein the drive apparatus comprises a motor and a screw rod connected to the motor, the first connecting member being sleeved on the screw rod and being screwed to the screw rod;
wherein a middle portion of the first connecting member bends toward a direction away from the motor.

2. The undercarriage according to claim 1, wherein the power assembly further comprises a second connecting member that is fixed to the screw rod and that is at an end opposite to the motor, one end of the second connecting rod being hinged on the second connecting member, and the other end thereof being hinged on the first connecting rod.

3. The undercarriage according to claim 2, wherein a middle portion of the second connecting member bends toward a direction close to the motor.

4. The undercarriage according to claim 1, wherein an angle between the second connecting rod and the screw rod when the undercarriage body is unfolded is greater than an angle between the second connecting rod and the screw rod when the undercarriage body is folded.

5. The undercarriage according to claim 1, wherein an angle between the first connecting rod and the screw rod is less than 90 degrees when the undercarriage body is unfolded, and the first connecting rod is parallel to the screw rod when the undercarriage body is folded.

6. The undercarriage according to claim 1, wherein the first connecting rod further comprises a support rod, the support rod causing the first connecting rod to be T-shaped.

7. The undercarriage according to claim 1, wherein the first connecting rod bends toward a direction keeping off an element inside the fuselage.

8. An unmanned aerial vehicle, comprising a fuselage and the undercarriage according to claim 1, wherein the undercarriage when folded is located in the fuselage.

* * * * *